United States Patent
Lammel et al.

(10) Patent No.: US 8,492,855 B2
(45) Date of Patent: Jul. 23, 2013

(54) MICROMECHANICAL CAPACITIVE PRESSURE TRANSDUCER AND PRODUCTION METHOD

(75) Inventors: Gerhard Lammel, Tuebingen (DE);
Hubert Benzel, Pliezhausen (DE);
Simon Armbruster, Gomaringen (DE);
Christoph Schelling, Stuttgart (DE);
Joerg Brasas, Detmold (DE)

(73) Assignee: Robert Bosch GmbH, Stuttgart (DE)

( * ) Notice: Subject to any disclaimer, the term of this patent is extended or adjusted under 35 U.S.C. 154(b) by 1251 days.

(21) Appl. No.: 12/086,829

(22) PCT Filed: Nov. 22, 2006

(86) PCT No.: PCT/EP2006/068758
§ 371 (c)(1),
(2), (4) Date: Nov. 14, 2008

(87) PCT Pub. No.: WO2007/071515
PCT Pub. Date: Jun. 28, 2007

(65) Prior Publication Data
US 2009/0101997 A1    Apr. 23, 2009

(30) Foreign Application Priority Data
Dec. 20, 2005 (DE) .......................... 10 2005 060 855

(51) Int. Cl.
*H01L 21/20* (2006.01)
*H01L 29/84* (2006.01)

(52) U.S. Cl.
USPC ............. 257/414; 257/415; 257/419; 438/52; 438/53

(58) Field of Classification Search
USPC ............. 427/162; 257/415, E21.09, E29.324, 257/414, 417, 419; 438/52, 53
See application file for complete search history.

(56) References Cited

U.S. PATENT DOCUMENTS

| | | | | |
|---|---|---|---|---|
| 4,861,420 A | * | 8/1989 | Knutti et al. | 438/51 |
| 5,177,661 A | | 1/1993 | Zavracky et al. | |
| 5,470,797 A | * | 11/1995 | Mastrangelo | 438/53 |

FOREIGN PATENT DOCUMENTS

| | | |
|---|---|---|
| DE | 44 10 631 | 10/1994 |
| DE | 101 14 036 | 10/2002 |
| DE | 10 2004 03 6032 | 7/2005 |
| DE | 10 2004 04 3357 | 3/2006 |
| DE | 10 2004 06 1796 | 7/2006 |
| WO | 2005/077815 | 8/2005 |

* cited by examiner

*Primary Examiner* — Mathieu D. Vargot
(74) *Attorney, Agent, or Firm* — Kenyon & Kenyon LLP (57) ABSTRACT

The present invention describes a method for producing a micromechanical capacitive pressure transducer and a micromechanical component produced by this method. First, a first electrode is produced in a doped semiconductor substrate. In a further method step, a diaphragm with a second electrode is produced at the surface of the semiconductor substrate. Furthermore, it is provided to apply a first layer, which preferably is made of dielectric material, on the diaphragm and the semiconductor substrate. With the aid of this first layer, the diaphragm and the semiconductor substrate of the finished micromechanical capacitive pressure transducer are mechanically connected to one another directly or indirectly. Furthermore, a buried cavity is produced in the semiconductor substrate between the first and second electrode. In a following etching step, the diaphragm is finally dissolved out of the semiconductor substrate through openings in the first layer, the mechanical connection from the diaphragm to the semiconductor substrate being accomplished with the aid of the first layer. Due to this mechanical connection the diaphragm or the second electrode is able to be movably suspended above the first electrode.

6 Claims, 10 Drawing Sheets

MICROMECHANICAL CAPACITIVE PRESSURE TRANSDUCER AND PRODUCTION METHOD

FIELD OF THE INVENTION

The present invention relates to a method for producing a micromechanical capacitive pressure transducer and to a micromechanical component produced according to this method.

BACKGROUND INFORMATION

A method for producing micromechanical sensors is discussed in German patent document DE 101 14 036 A1. There, openings, which transform themselves into cavities in the depth of the substrate under a sealed diaphragm cover during a subsequent heat treatment, are introduced in a semiconductor substrate. A capacitive pressure sensor can be produced by this method, the cavity being created between two doping zones in the substrate. If these two zones are electrically insulated from one another they form a plate-type capacitor whose capacitance depends on the spacing of the doping zones. Both doping zones can be electrically connected to a suitable evaluation circuit by deep contacting. A deformation of the semiconductor substrate can thus be converted into a measurable change in the capacitance. The measuring result results as ratio of the ambient pressure relative to the pressure inside the cavity. The sensor element described in the document has the disadvantage that the two electrodes are insulated from one another only via pn transitions, which constitute parasitic capacitances and lead to undesired leakage currents.

Another method for producing a cavity in a semiconductor substrate is discussed in the not pre-published patent document DE 10 2004 04 3357 A1. In this case, a lattice-like structure made from a substrate material etched non-porous is created on the surface of a semiconductor substrate. A porosified region is produced into the depth of the semiconductor substrate between the lattice-like structure. With the aid of a subsequent heat treatment, the porosified region is then transformed into a cavity by relocation of the semiconductor material. At the same time, the heat treatment may also be used to reform the lattice-like structure into a diaphragm above the cavity.

The production of a diaphragm with the aid of an epitaxy layer on stabilizing elements above a cavity is discussed in the not pre-published patent document DE 10 2004 03 6032 A1. In this case, material is selectively dissolved out of the semiconductor material to form the stabilizing elements, thereby creating porous silicon in the porous region that later includes the cavity.

The design of a capacitive micromechanical sensor element with the aid of different epitaxy layers is discussed in the not pre-published patent document DE 10 2004 06 1796 A1.

SUMMARY OF THE INVENTION

The present invention describes a method for producing a micromechanical capacitive pressure transducer and a micromechanical component produced by this method. The micromechanical capacitive component in the form of a pressure transducer is produced with the aid of surface-micromechanical process steps. To begin with, a first electrode is created in a semiconductor substrate, it being provided, in particular, that the semiconductor substrate is doped at least regionally. In a further method step, a diaphragm with a second electrode is produced at the surface of the semiconductor substrate. The second electrode may lie at the surface of the semiconductor substrate as part if it, or it is applied on the surface of the semiconductor substrate. Following the deposition, a topology is optionally produced in the epitaxy layer. Furthermore, a first layer, which may be made of dielectric material, is deposited is deposited on the diaphragm and the semiconductor substrate. With the aid of this first layer, the diaphragm and the semiconductor substrate of the finished micromechanical capacitive pressure transducer are mechanically connected to one another either directly or indirectly. Furthermore, a buried cavity is produced in the semiconductor substrate between the first and second electrode. In a following etching step, the diaphragm is finally dissolved out of the semiconductor substrate through openings in the first layer, the mechanical connection from the diaphragm to the semiconductor substrate being accomplished at least with the aid of a first layer. Due to this mechanical connection, the diaphragm or the second electrode is able to be movably suspended above the first electrode.

The use of surface-micromechanical method steps to produce the capacitive pressure transducer makes the production much more cost-effective since only one surface requires processing. As a result, no time-consuming epitaxy steps with subsequent patterning are required that must be implemented multiple times one after the other. Capacitive sensor elements having small lateral and vertical dimensions relative to the substrate are therefore able to be produced with the aid of the provided method. Due to the micromechanical sensor structure produced in this manner, the capacitive sensor element is able to be operated at low power consumption. It is especially advantageous in this context that already known standard processes of surface micromechanics (SMM) may be utilized for the production. Using a monolithic design makes it possible to integrate the utilized micromechanics together with the microelectronics on one chip. It is especially advantageous that the two electrodes are electrically completely insulated from one another, so that no leakage currents will flow. Parasitic capacitances caused by pn transitions are omitted.

In one development of the present invention, the cavity is produced by an isotropic etching process or by rendering the semiconductor material porous in a sacrificial region of the semiconductor substrate, with subsequent thermal relocation or removal of the porosified semiconductor substrate by dissolution.

When using porous silicon to produce the cavity, starting from the surface of the semiconductor substrate, cut-outs in the form of lattice-like structures may be provided at the surface of the semiconductor substrate in the sacrificial region during the porosification. The second electrode for forming the capacitive pressure transducer is produced by a subsequent thermal relocation of the not porously etched lattice-like structure of the semiconductor substrate, which may be when forming the cavity. As an alternative, the second electrode may also be produced by applying a conductive layer on top of the lattice-like structure.

To reinforce the diaphragm, an epitaxy layer, which is covered by the first layer, may be deposited on the surface of the semiconductor substrate or on the second electrode. It is especially advantageous in this context if the first layer contains a dielectric material. Prior to applying the epitaxy layer, a topology may optionally be produced in the epitaxy layer at the edge of the cavity or diaphragm, for example using a LOCOS process or a LOCOS process with subsequent removal of the LOCOS layer. This topology may be used to adjust the sensitivity of the pressure sensor via the rigidity of the diaphragm edge.

Sacrificial-layer etching holes are advantageously formed in the first layer in the lateral region of the diaphragm. These sacrificial-layer etching holes constitute the access for separating the second electrode from the semiconductor substrate with the aid of the etching process. In one special further development of the exemplary embodiments and/or exemplary methods of the present invention, the etching process may also be used for a separation of the applied epitaxy layer. In so doing, the epitaxy layer above the cavity may be separated from the epitaxy layer above the semiconductor substrate surrounding the cavity. In this way a (local) thickening of the diaphragm by the epitaxy layer is possible.

It is advantageously provided to apply a second layer, in particular a structured layer, on the first layer above the edge region of the diaphragm in order to reinforce the mechanical connection between diaphragm and semiconductor substrate. If the second layer, which may consist of polysilicon, for instance, is applied prior to the etching process for forming the diaphragm, then sacrificial layer etching holes are provided both in the first and the second layer in order to remove the material for separating the diaphragm from the semiconductor substrate.

In one special development of the exemplary embodiments and/or exemplary methods of the present invention, the second layer is structured in the form of a spring-like suspension of the diaphragm. This spring-type suspension is provided in the edge region of the diaphragm, in particular. In special developments, the spring-type suspension may encompass the entire edge region of the diaphragm. It is advantageous if the second layer is patterned in such a way that several elements are produced, which are not connected to one another and are spatially restricted.

Following the etching process for separating the diaphragm from the semiconductor substrate, the sacrificial-layer etching holes are sealed. This may be accomplished by an oxidation, for example, or by sealing them with a fill-in material.

The exemplary embodiments and/or exemplary methods of the present invention may be used to advantage for pressure sensors, microphones, acceleration sensors in the z-direction, and for other sensors in which an electrical or largely thermal insulation of the (monocrystalline) diaphragm is desired and/or which operate on the basis of a capacitive converter principle. To realize differential-pressure sensors or microphones, it may be provided to open the cavity from the rear side of the semiconductor substrate. A trenching process is advantageously used for that purpose.

Further advantages result from the following description and the dependent claims.

DETAILED DESCRIPTION

A capacitive pressure measurement requires electrodes that are set apart and electrically insulated from one another, which should be electrically controlled individually. According to the exemplary embodiments and/or exemplary methods of the present invention, these electrically insulated electrodes are worked out of a semiconductor substrate. The first electrode may be formed by the use of a doped semiconductor substrate itself. In an additional exemplary embodiment, however, it is also possible to produce the first electrode in the semiconductor substrate by doping the semiconductor substrate in a spatially restricted region.

According to the exemplary embodiments and/or exemplary methods of the present invention, the second electrode, which may likewise be made of the semiconductor material and is worked out of the semiconductor substrate and possibly the epitaxy layer, may be flexibly suspended on the substrate above a cavity by a dielectric layer. Optionally, it may also be provided to anchor the flexible second electrode on the substrate via spring-type suspensions or reinforcements. The second electrode, either on its own or together with additional layers deposited on the semiconductor substrate, constitutes the measuring diaphragm, which generates an electric signal in a position-dependent manner as a function of a pressure that is acting on it. Due to the use of the diaphragm as inert mass, the micromechanical component produced in this manner may also be employed as acceleration sensor in the z-direction.

Figure 1A:
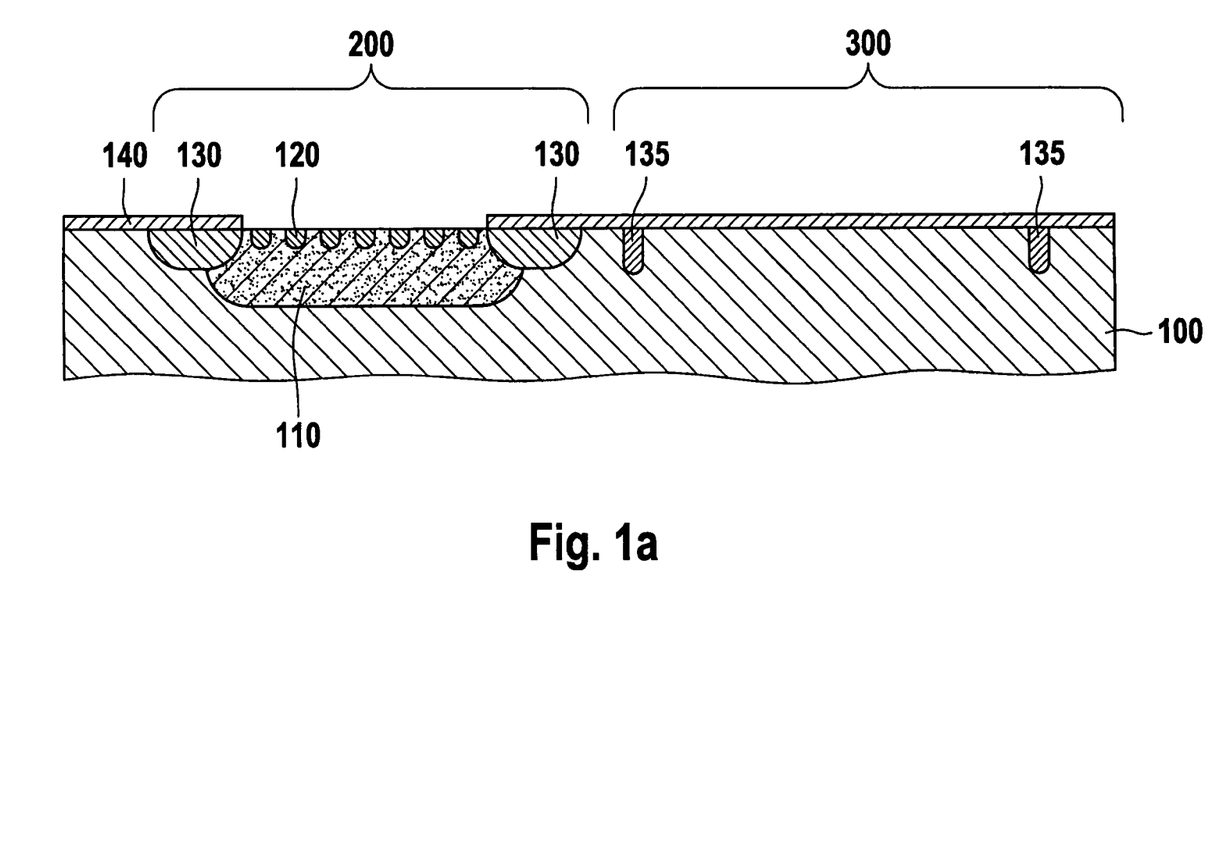
FIGS. 1a, 1b, 1c, 1d, 1e, 1f, 1g, 1h, and 1i show the production method according to the present invention.

On the basis of a p-doped semiconductor substrate 100, a pressure-sensor region 200 is produced according to the present invention starting from the top surface of semiconductor substrate 100, as shown in FIG. 1a. A circuit region 300 may be optionally produced in addition to generated pressure-sensor region 200. When producing this circuit region 300, process steps may be used simultaneously, e.g., within the framework of surface-micromechanical process steps that are used to produce pressure-sensor region 200. To create cavity 115, porous silicon is produced in a first region 110 of semiconductor substrate 100, for example by selective removal of the semiconductor material by dissolving. Then, cavity 115 is produced out of the porous silicon in first region 110, for example by a thermal relocation step. Since the production of porous silicon does not constitute a subject matter of the present invention, explicit reference is made to German patent document DE 100 32 579 A1, where the production method for porous silicon, which may be used, is described. As shown in FIG. 1a, webs or lattice-like structures 120 are cut out in region 110, which, by a selective etching process or by special masking techniques, are not rendered porous by etching. These lattice-like structures 120 form second electrode 125 in the subsequent thermal relocation step. Furthermore, n-doped regions 130 are produced at the edge of region 110 or future cavity 115, by redoping. Due to this redoping, a lateral delimiting of the electrochemical etching process required in the production of porous silicon region 110 is possible. At the same time, the n-doped regions are utilized for delimiting the cavity. The redoping of regions 130, which may extend around the cavity, and the production of connection regions 135 for circuit region 300 may be implemented by implantation and/or diffusion methods, for example. The production of porous region 110 is advantageously realized by an etching mask 140, e.g., made of silicon dioxide and/or silicon nitride. As far as the specific production of the lattice-like structures is concerned, reference is made to the not prepublished publications DE 10 2004 03 6035 A1 and DE 10 2004 04 3357.

Figure 1B:
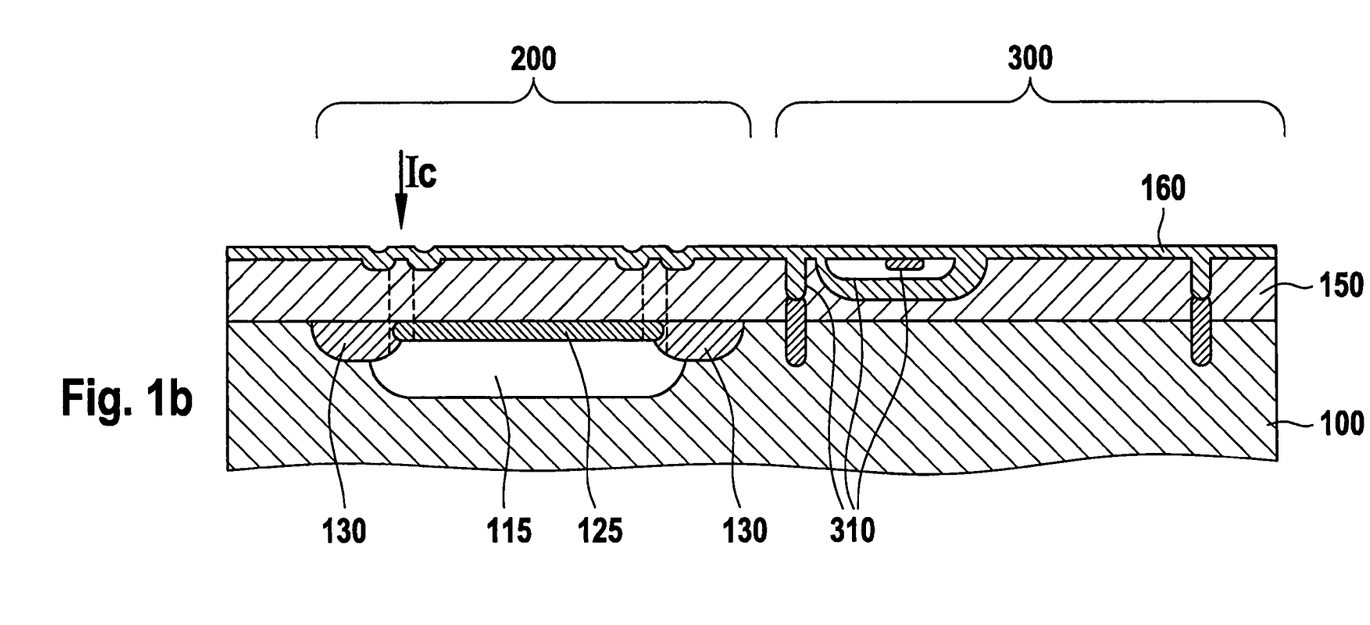
Figure 1C:
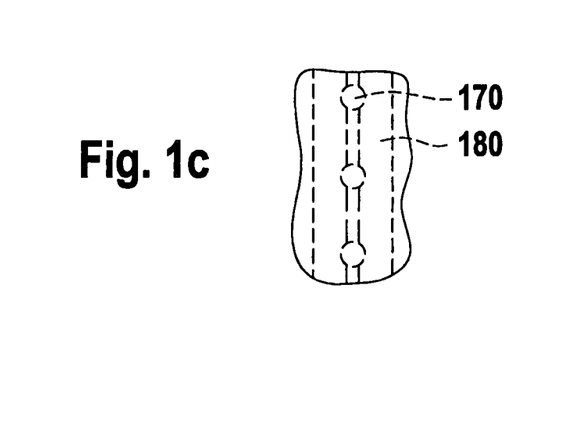

After the removal of etching mask 140, an epitaxy layer 150 is applied on the semiconductor substrate and second electrode 125, produced by the thermal relocation, as shown in FIG. 1b. A topology may optionally be produced in edge region 180 of the cavity or the diaphragm, e.g., via a LOCOS process with subsequent removal of the LOCOS oxide. Then, one or a plurality of dielectric layer(s) (160), for instance consisting of silicon dioxide or silicon nitride, is applied on epitaxy layer 150. Furthermore, sacrificial-layer etching holes 170 are introduced in edge region 180 of the cavity or the diaphragm (cf. also the enlarged view in FIG. 1c), in order to separate, among others, diaphragm 125 from semiconductor substrate 100 or regions 130 in a subsequent method step. To produce a sealed diaphragm, the sacrificial-layer etching holes are sealed again by later deposition of a sealing layer. As already mentioned, parallel to the processing of pressure-sensor region 200, elements 310 for realizing an integrated circuit may be produced in circuit region 300, which may be provided for the subsequent control or evaluation of the capacitive pressure sensor.

Figure 1D:
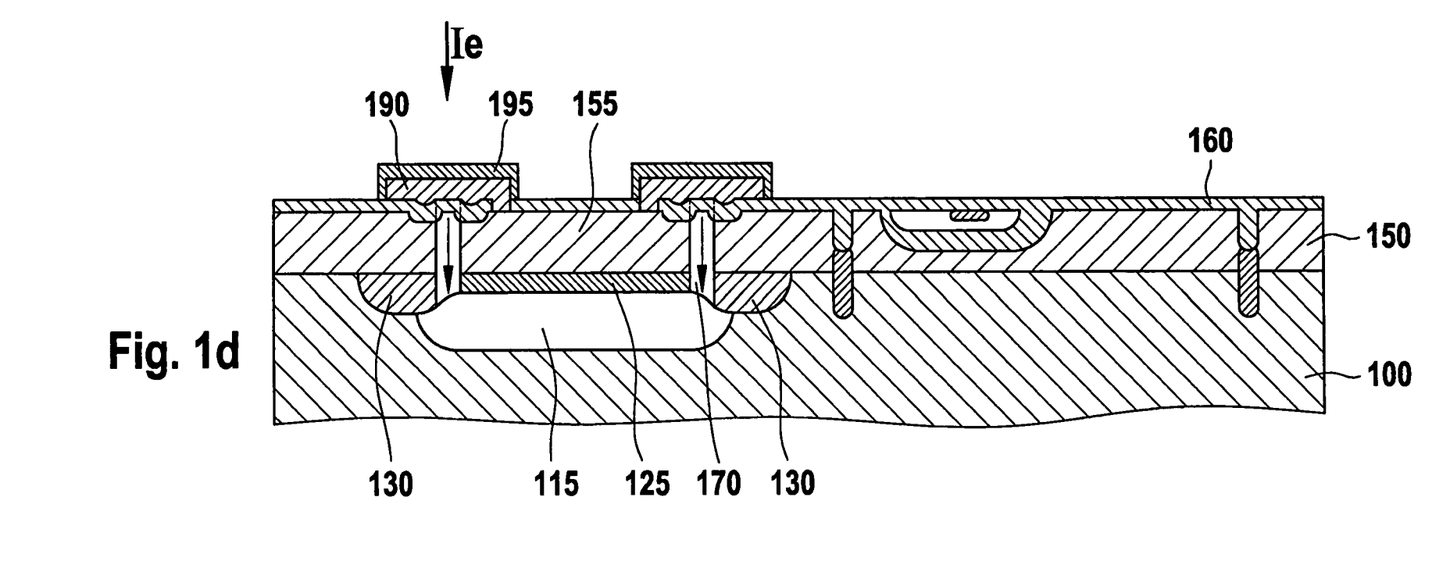
Figure 1E:
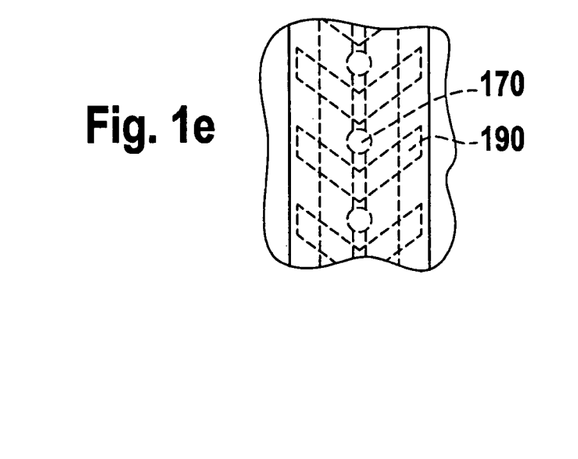

FIG. 1d and FIG. 1e illustrate optional developments of the production method according to the present invention and the micromechanical component produced by the method. In the process, spring-type suspensions 190 are produced above the edge of the diaphragm or cavity 115 in such a way that the mechanical suspension of the diaphragm is facilitated via dielectric layer 160. A second layer may first be applied on first dielectric layer 160 in order to then be patterned into spring-type suspensions 190. As can be gathered from FIG. 1e, spring-type suspensions 190 are implemented as individual elements, which are separated from one another and spatially restricted to a region above the edge region of the cavity. These spring-type suspensions 190 are provided to stabilize the mechanical suspensions of the diaphragm. These spring-type suspensions 190 may be made from polysilicon. To protect spring-type suspensions 190, the polysilicon is covered by a passivation layer 195. If spring-type suspensions 190 are used for the mechanical suspension of the diaphragm or electrode 125, then elements 190 may be produced prior to the separation of second electrode 125 from region 130 in order to ensure the mechanical stability of the diaphragm, which is made up of epitaxy layer 155 and second electrode 125.

Figure 1F:
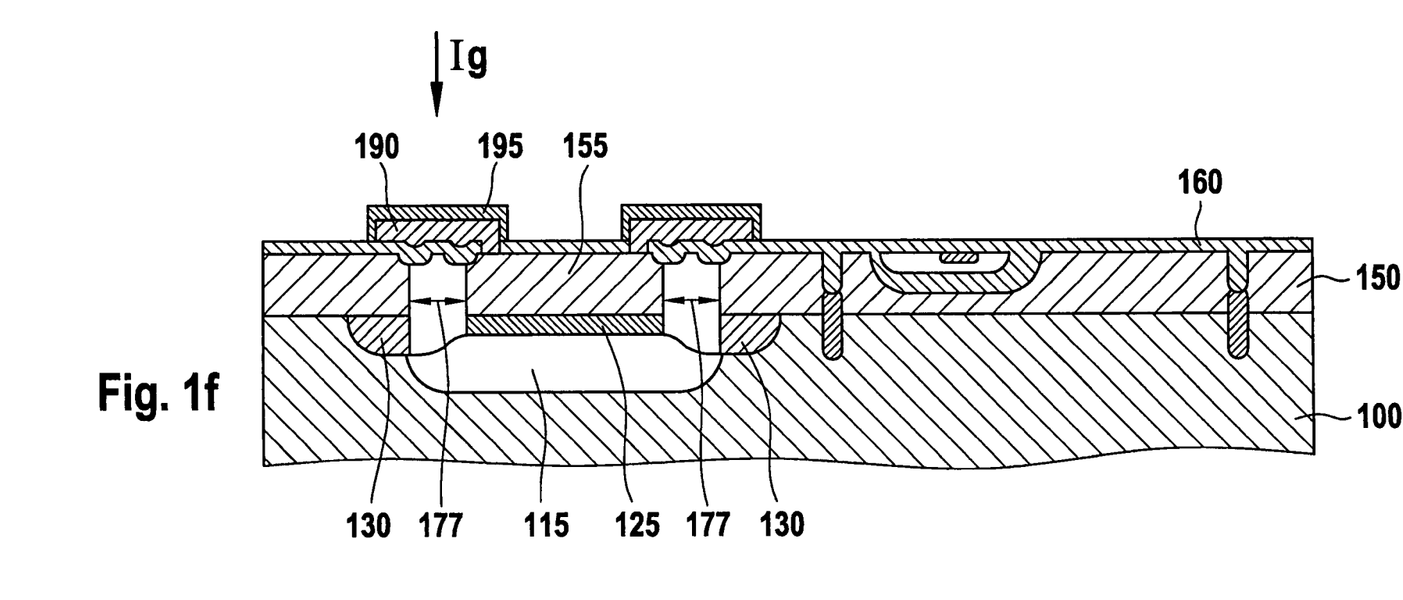
Figure 1G:
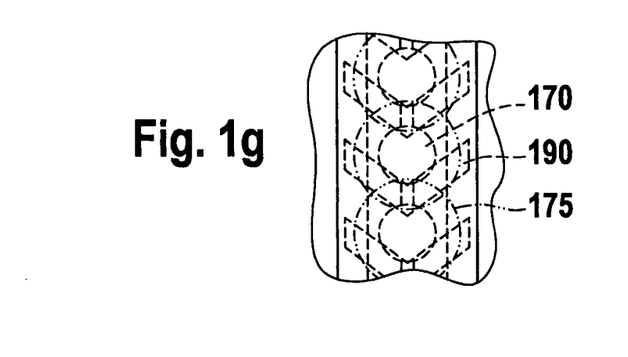

Starting from sacrificial-layer etching holes 170, lateral etching of epitaxy layer 150 as well as second electrode 125 and regions 130 is implemented, as illustrated in FIG. 1f. Due to this lateral etching, electrode 125 is separated from edge region 130. The etching process is implemented until the diaphragm electrode is supported only via dielectric layer 160 and possibly spring-type suspensions 190. The lateral etching is advantageously implemented with the aid of gas-phase etching, using $ClF_3$ or $SF_6$, for example, etching fronts 175 being produced in the process as shown in FIG. 1g. This lateral etching increases distance 177 of the diaphragm electrode, made up of electrode 125 and epitaxy layer 155, from the semiconductor substrate that surrounds it, made up of semiconductor substrate 100 and epitaxy layer 150.

The sacrificial layer etching of the substrate material or the epitaxy material may be implemented both in one stage with the aid of an isotropic etching method, or also in two stages, as illustrated, i.e., first anisotropically and then isotropically after etching through the diaphragm.

Figure 1H:
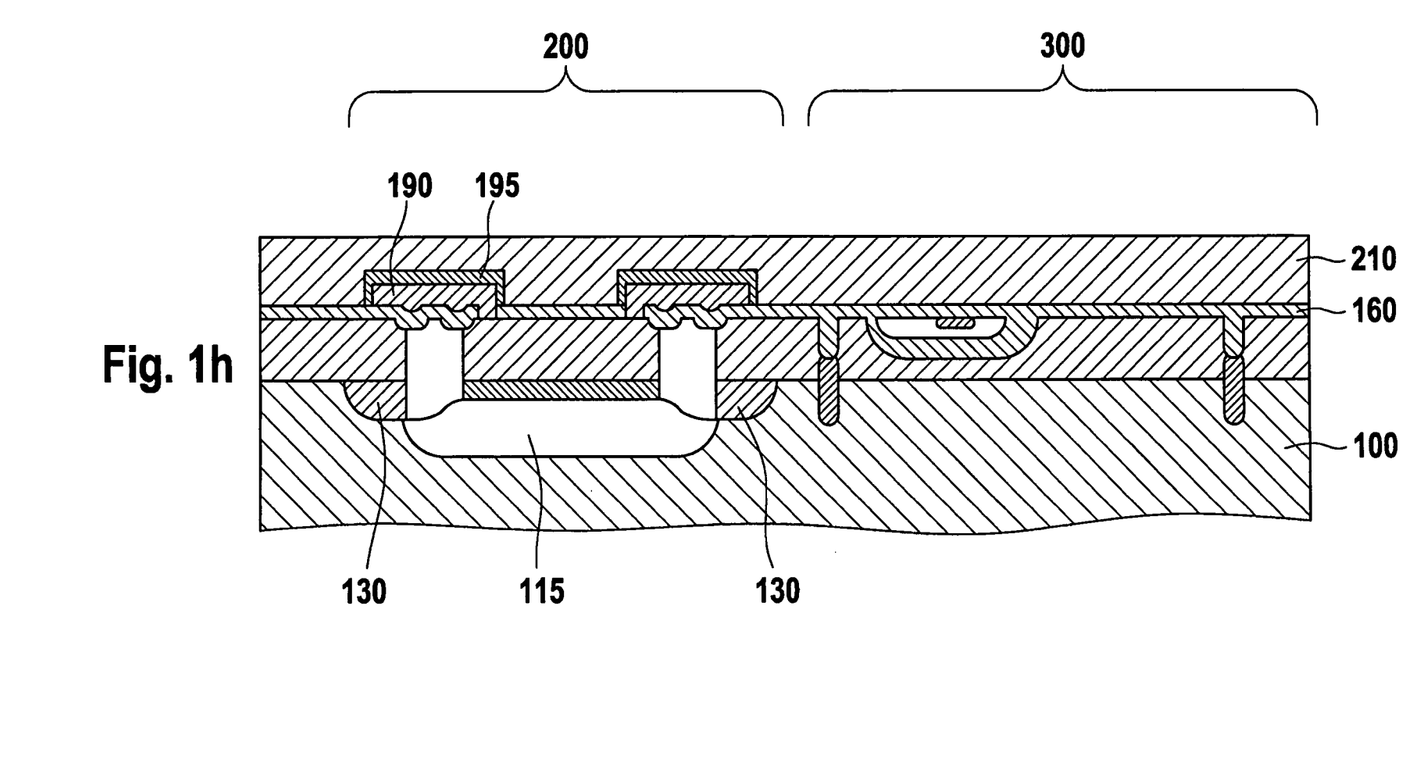

To produce a sealed volume in the cavity, once the lateral etching has taken place, at least one passivating layer 210 is deposited, which seals sacrificial-layer etching holes 170 and produces a planarized surface of the sensor element. As an alternative, the sacrificial-layer etching holes may also be sealed with the aid of an oxidation of the semiconductor material of the holes.

Figure 1I:
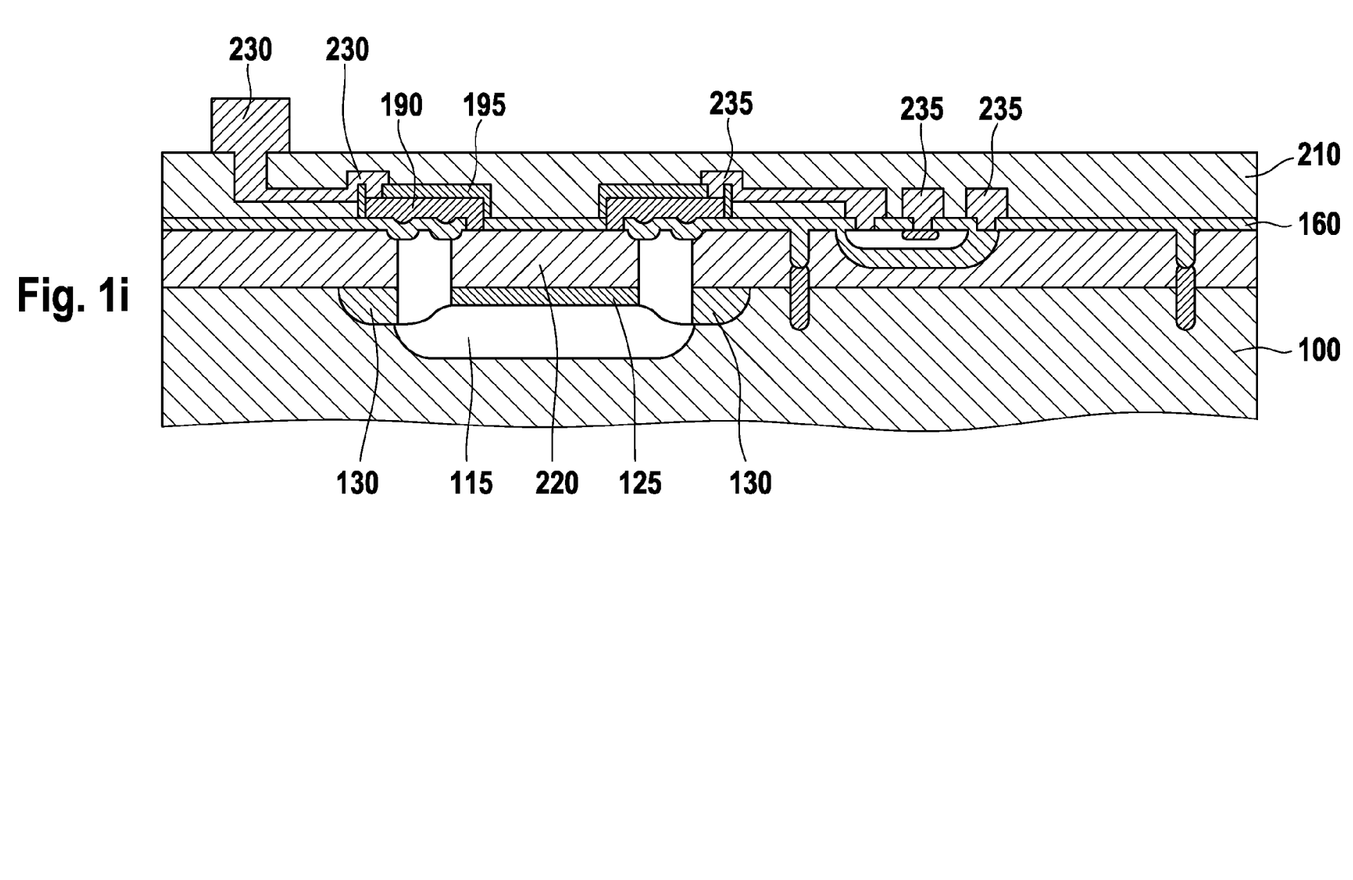

In the final backend circuit process, as shown in FIG. 1i, metallizations 230 and 235 are produced for the contacting of diaphragm electrode 220. Because of the use of polysilicon as material for spring-type suspensions 190 and because of the use of conductive epitaxy material for layer 150, contacting of second electrode 125 is possible. On the other hand, the first electrode may be contacted by special elements 135, which may simultaneously be utilized for the circuit elements in circuit region 300. In general, contactings 235 of the circuit elements in circuit region 300 are also implementable parallel to the contactings in sensor region 200. These contactings may be routed to the surface of the semiconductor substrate produced in this manner. As an alternative, it may also be provided to continue the routing of the contactings buried under layer 210.

Figure 2A:
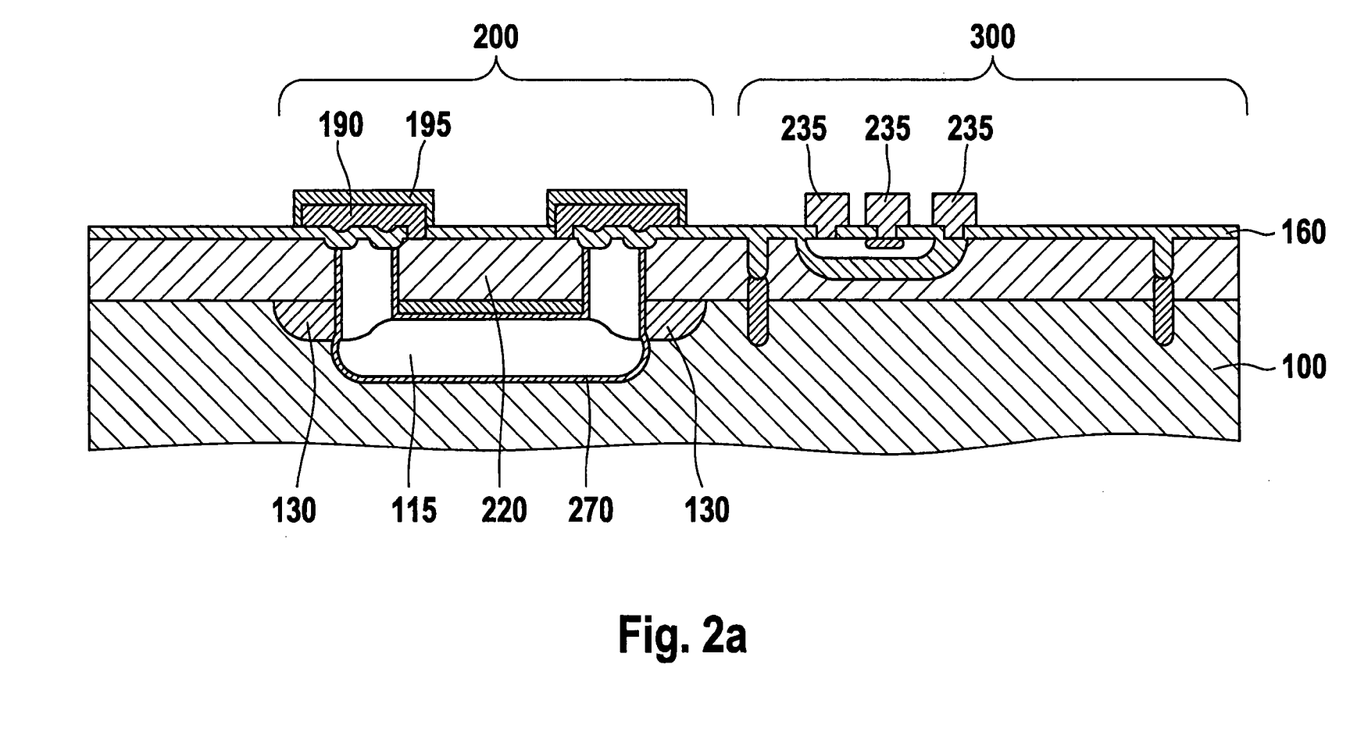
FIGS. 2a, 2b and 2c show the production method for a relative-pressure sensor.
Figure 2B:
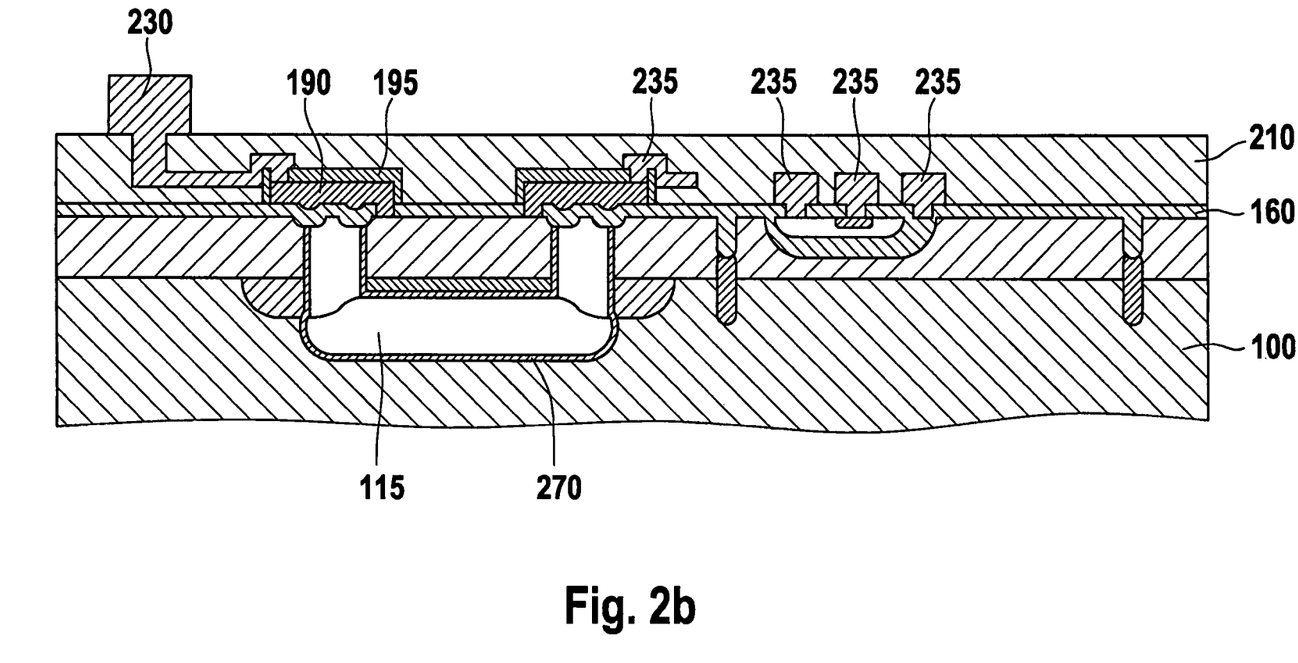

To produce a relative-pressure sensor with the aid of the method according to the present invention, cavity 115 must be opened from the rear side of semiconductor substrate 100. To this end, method steps according to FIGS. 1a through 1g are first utilized prior to implementing method steps according to the FIGS. 2a through 2c subsequently. Following lateral etching of sacrificial-layer etching holes 170, an oxidation layer 270 is produced on the inside of the cavity. As an alternative, it is also possible to deposit a dielectric layer 270 on the inside of the cavity. In the present exemplary embodiment, contacting of diaphragm electrode 125 and the circuit elements in the circuit region is implemented according to the metallization step of FIG. 1i (cf. FIG. 2b in conjunction with FIG. 1i). Finally, as already described in connection with the method step relating to FIG. 1i, a passivation layer 210 is deposited.

Figure 2C:
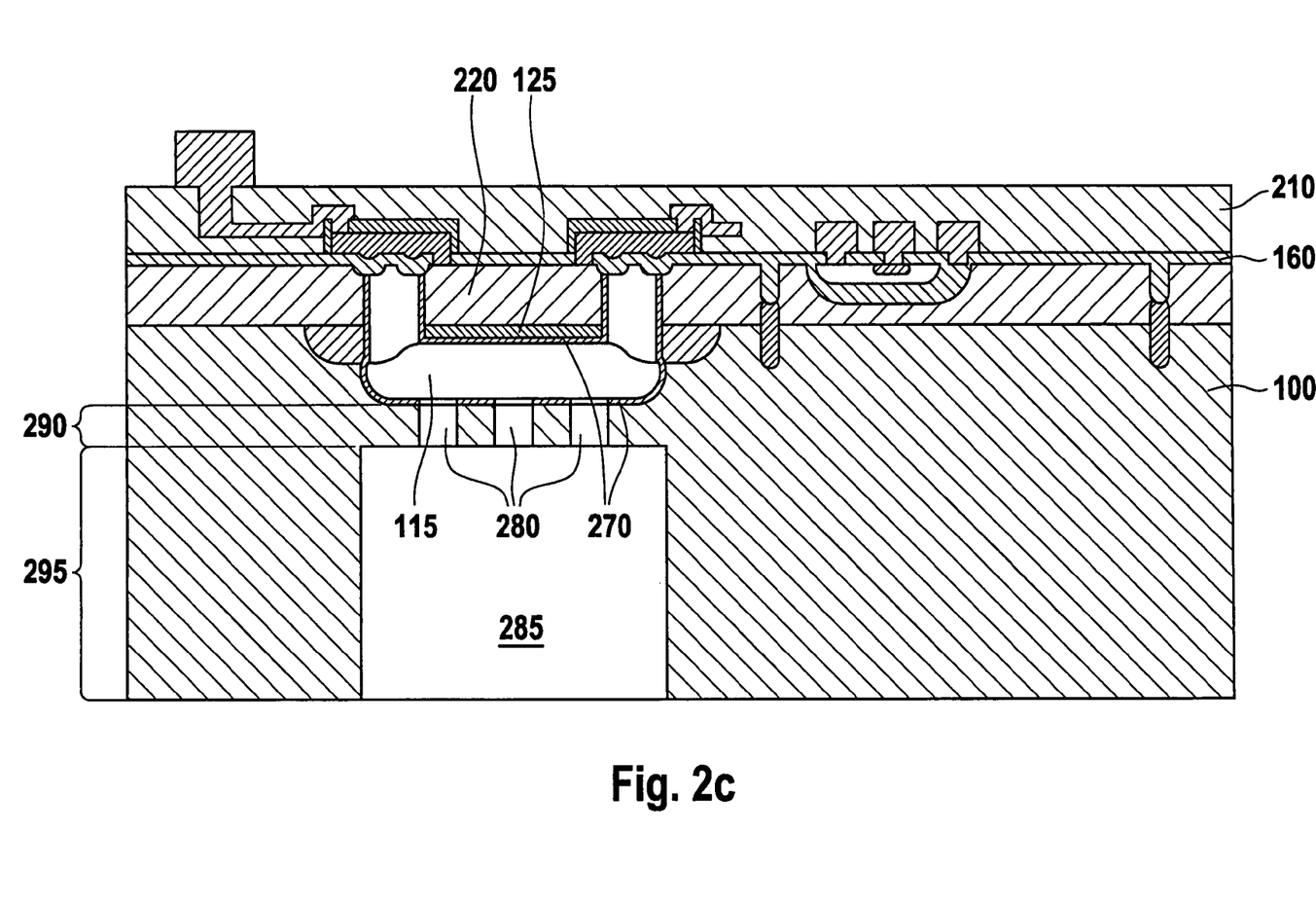

To achieve an opening of cavity 115, a two-stage trench-etching step from the rear side of semiconductor substrate 100 is implemented in the present exemplary embodiment. In the process, an opening 285 is produced in a first deep-trenching step 295. Ventilation holes 280 are then introduced from the rear side of cavity 115 using a flat-trench etching process 290. For example, a directed oxide etching from the rear side may be used here to remove oxide layer 270 above ventilation holes 280 (cf. FIG. 2c). The first electrode, which is produced in the region of opening 285 across from second electrode 125, may be given an appropriate design by the number and shape of ventilation holes 280.

Figure 3:
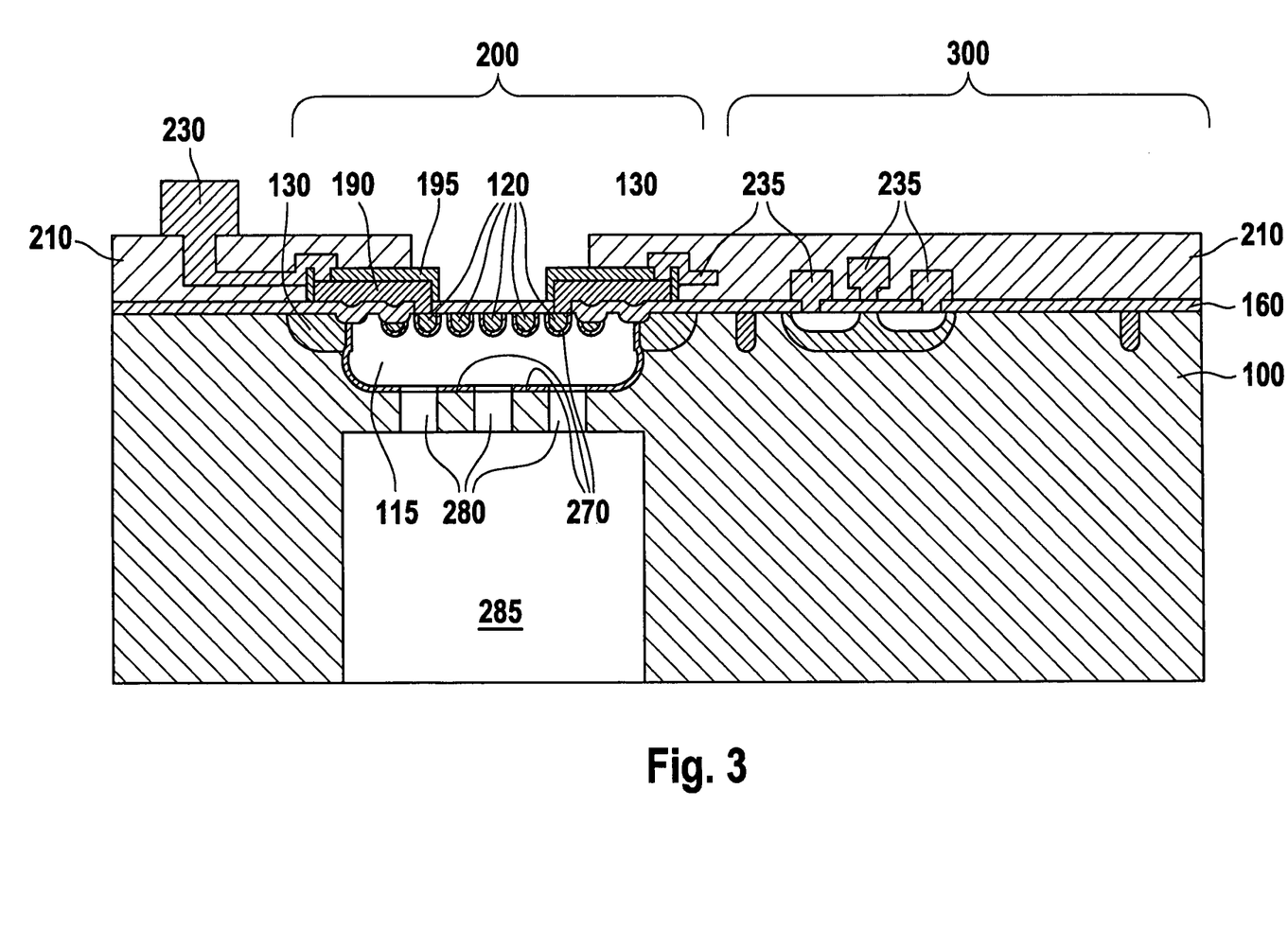
FIG. 3 shows another exemplary production method of a microphone using the production process according to the present invention.

FIG. 3 shows another exemplary embodiment for realizing a capacitive microphone, a differential-pressure sensor or a z-acceleration sensor. As already described with the aid of FIG. 2c, openings in cavity 115 are produced from the rear side of semiconductor substrate 100 using different trench-etching steps. To adjust the sensitivity of the capacitive pressure transducer, the diaphragm layer, made up of second electrode 125 or 120 and epitaxy layer 155, is retroactively rethinned, using an additional etching process, for example. As an alternative, it may also be provided that the lattice-type structures 120 not be thermally relocated into a diaphragm layer 125, as illustrated in FIG. 3. This makes it possible to use lattice-like structures 120 themselves as second electrode. Optionally, lattice-like structures 120 may also be used merely as skeleton for the second electrode, made up of layer 195 above the first electrode.

In an advantageous manner, a monocrystalline silicon substrate is used as substrate. If the thermal relocation process for forming second electrode 125 is controlled appropriately, then it is also possible that the second electrode likewise forms itself as monocrystalline silicon.

A method for producing a micromechanical capacitive pressure transducer and a micromechanical component produced by this method. First, a first electrode is produced in a doped semiconductor substrate. A diaphragm with a second electrode is next produced at the surface of the semiconductor substrate. Furthermore, it is provided to apply a first layer, which may be made of dielectric material, on the diaphragm and the semiconductor substrate. With this first layer, the diaphragm and the semiconductor substrate of the finished micromechanical capacitive pressure transducer are mechanically connected to one another directly or indirectly. Furthermore, a buried cavity is produced in the semiconductor substrate between the first and second electrode. In an etching, the diaphragm is finally dissolved out of the semiconductor substrate through openings in the first layer, the mechanical connection from the diaphragm to the semiconductor substrate being accomplished with the first layer. Due to this mechanical connection the diaphragm or the second electrode is movably suspendable above the first electrode.

What is claimed is:

1. A mechanical component, comprising:
   a first electrode within a silicon semiconductor substrate;
   a diaphragm having an epitaxy layer and a second electrode;
   a first layer on the diaphragm and the semiconductor substrate;
   a cavity buried between the first electrode and the second electrode; and
   a second layer, which includes polysilicon, situated on the first layer above an edge region of the diaphragm, the second layer being configured as a spring-type suspension of the diaphragm in at least one section of the edge region of the diaphragm, and wherein the second layer is structured into multiple elements that are not connected to each other and that are at least one of spatially restricted, which jointly form the spring-type suspension of one of the diaphragm and the second electrode, and allow an electrical contacting of the second electrode;
   wherein the diaphragm is held above the first electrode by the first layer so as to allow movement, and the second electrode is laterally set apart from the semiconductor substrate, and
   wherein the micromechanical component is made by performing the following:
   producing the first electrode within a silicon semiconductor substrate;
   producing a monocrystalline, lattice-like structure for forming the second electrode above a first region, etched to be porous, in the silicon semiconductor substrate;
   applying an epitaxy layer on the silicon semiconductor substrate and the second electrode;
   applying the first layer on the epitaxy layer;
   producing the buried cavity between the first electrode and the second electrode by the first region; and
   forming the diaphragm on the second electrode above the first porous region by separating the epitaxy layer on the second electrode from the epitaxy layer on the semiconductor substrate with an etching process, wherein the separation produces a flexible, mechanical connection between the diaphragm and the silicon semiconductor substrate by the first layer.

2. The micromechanical component of claim 1, wherein contacting of the second electrode is implemented through the epitaxy layer.

3. The micromechanical component of claim 1, wherein the first layer has a topology in an edge region of the cavity.

4. The micromechanical component of claim 1, wherein at least one of the first layer and the second layer includes sacrificial-layer etching holes, the sacrificial-layer etching holes being sealed by one of an oxide and a fill-in material.

5. The micromechanical component of claim 2, wherein the component is usable as one of an absolute-pressure sensor, a relative-pressure sensor, a microphone, or an acceleration sensor, and
   wherein when the component is usable as the relative-pressure sensor or the microphone, the relative-pressure sensor or the microphone has at least one of a cavity, introduced from a rear side of the semiconductor substrate, and the first electrode has at least one through hole.

6. The micromechanical component of claim 1, wherein the buried cavity is at least partially surrounded by an edge region, and wherein a doping of the edge region and a doping of the first electrode and the second electrode are of a different type.

* * * * *

UNITED STATES PATENT AND TRADEMARK OFFICE
CERTIFICATE OF CORRECTION

PATENT NO. : 8,492,855 B2  Page 1 of 1
APPLICATION NO. : 12/086829
DATED : July 23, 2013
INVENTOR(S) : Lammel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this
Eighth Day of September, 2015

Michelle K. Lee
*Director of the United States Patent and Trademark Office*